Sept. 30, 1924.                    W. RAYMOND                    1,510,161
                              REGULATOR FOR COMPRESSORS
                                  Filed March 1, 1923
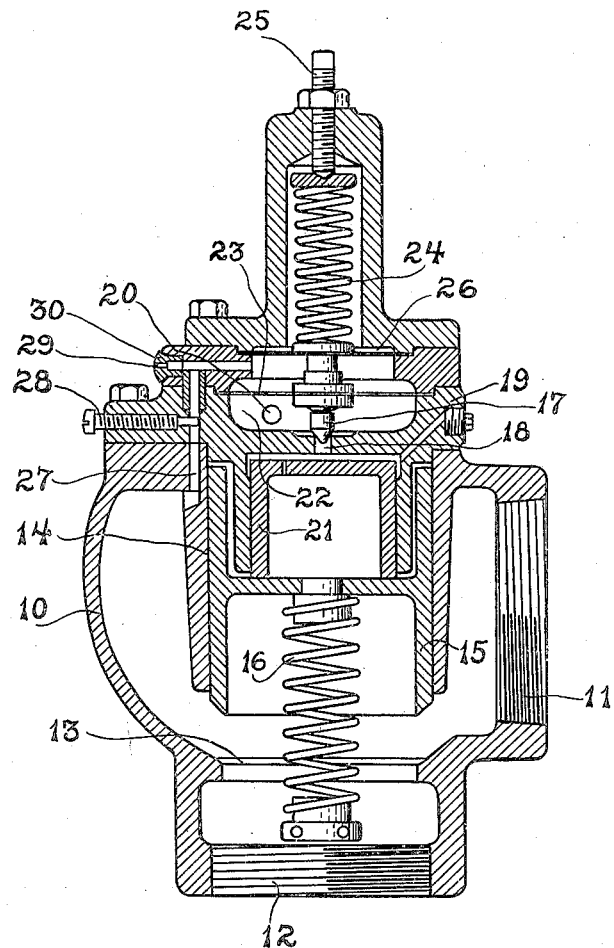
INVENTOR
Ward Raymond
BY Joseph N. Schofield
ATTORNEY Patented Sept. 30, 1924.

1,510,161

UNITED STATES PATENT OFFICE.

WARD RAYMOND, OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA.

REGULATOR FOR COMPRESSORS.

Application filed March 1, 1923. Serial No. 622,218.

*To all whom it may concern:*

Be it known that I, WARD RAYMOND, a citizen of the United States, residing at Easton, in the county of Northampton and State of Pennsylvania, have invented certain new and useful Improvements in Regulators for Compressors, of which the following is a specification.

This invention relates to regulators for compressors, and in particular to a regulator of the inlet type which is adapted to close the inlet to a compressor when the pressure of the fluid discharged from the compressor reaches a predetermined amount.

The object of the present invention is to provide an improved regulator of the above type which will permit the pressure of the discharged fluid to be limited precisely to a predetermined amount. Another object is to provide means whereby the range of operation of the compressor may be varied between adjustable limits. That is, means are provided which will adapt the compressor to start operating when the receiver pressure has dropped different amounts from the predetermined maximum pressure. It will be obvious that under certain conditions of operation it is essential that close approximation to a predetermined receiver pressure is essential. Under other conditions of service a wider range is sufficient and therefore the compressor is not required to be loaded and unloaded so frequently. It is therefore a primary object of the invention to provide a regulator which may be adjusted to operate between predetermined critical pressures of the compressed fluid.

One of the advantages of the present invention is that this range of operation of the regulator is controlled by the adjustment of a screw which in different positions of adjustment controls the opening through a passage extending between certain parts of the regulator.

Another object of the present invention is to provide an improved form of regulator of the type disclosed in a Patent 1,402,016 granted me January 3, 1922, in which improved means are provided for controlling the operation of a pilot valve.

With the above and other objects in view, my invention consists in the features of construction and operation set forth in the following specification and illustrated in the accompanying drawing.

In the figure of the drawing, a vertical mid-sectional view of one embodiment of the present invention is shown.

The embodiment selected for illustration and description is one which I now deem preferable but it is to be understood that other forms of the invention may be devised without departing from the spirit of the invention. Also the drawing or description of this embodiment is not to be taken as limiting the invention, the claims appended to this specification being relied upon for that purpose.

In its broadest aspect my invention comprises the following principal parts; first, a body member having an opening adapted to be connected to the inlet of a compressor and another opening forming the inlet of the regulator; second, a valve therein adapted in its closed position to completely close the opening to the compressor; third, a cylinder within which the inlet closing valve operates; fourth, a fluid pressure supply above the cylinder, fifth, a pilot valve adapted to admit fluid into the cylinder to close the inlet controlling valve; sixth, a flexible diaphragm upon which the pilot valve is mounted, seventh, an adjustable spring normally holding the pilot valve in its closed position; eighth, a conduit extending from a point beyond the inlet closing valve to a point in rear of the diaphragm; ninth, means in said conduit to adjustably restrict the passage of fluid therethrough; and tenth, a constantly open leak port in said conduit.

Referring more in detail to the drawing, at 10 is shown a body member, having an opening 11 adapted to be connected to the intake of a compressor, and another opening 12 connected to atmosphere. Within the body member 10 is a valve seat 13 and a cylinder 14. A valve member 15 operates within the cylinder 14, and, in its lowermost position contacts with the valve seat 13 and completely closes the passage between the openings 11 and 12, thus completely closing the compressor inlet.

During normal operation of the compressor, and until the pressure of the compressed fluid is raised to a predetermined amount, the valve member 15 is held in its upper position by means of a spring 16. While the valve is so held in its uppermost position, the opening to the intake of the compressor through openings 12 and 11 is fully open.

To control the movement of this inlet closing valve 15 the pilot valve 17 is provided. The lower end of pilot valve 17 is conical and enters an opening 18 in a member 19 suitably attached to the body member 10. In its lowermost position, valve 17 completely closes the opening 18 but, in its open position admits fluid, under receiver pressure from an opening 20 connected to the compressor receiver, to enter opening 18. From the opening 18 the fluid passes into the cylinder 14 and forces valve 15 downward against the pressure of spring 16. Preferably a loose piston 21 may be provided contacting with a portion of the valve member 15.

As clearly shown in the drawing, the opening 20, which is connected with the receiver, admits fluid under discharge pressure at all times to a closed cavity 22 formed by the member 19 and connected as aforesaid with the cylinder 14 through opening 18. The upper limit of this cavity 22 comprises a flexible diaphragm 23 to the center of which is attached the pilot valve 17. Pressing against the upper surface of the diaphragm 23 is the coiled spring 24, the pressure of which may be regulated by means of a screw 25. Preferably this spring 24 is contained within a pressure-tight cavity or chamber 26 for a purpose presently to be described.

It will be seen from the above, that, until the receiver pressure of the compressor reaches a predetermined amount so that the pressure within cavity 22 is sufficient to flex the diaphragm 23, the valve 17 will remain closed. So long as valve 17 is closed the inlet valve 15 remains open. As soon, however, as the pressure within cavity 22 forces the diaphragm 23 upward and opens pilot valve 17, fluid passes through opening 18 and forces the valve 15 to close. With the inlet valve 14 closed, the compressor, which of course then runs idly, reduces the pressure within the body member 10 to a vacuum.

Advantage of this vacuum or reduction of pressure within the regulator is taken to vary the drop in pressure within the cavity 22 which will cause the inlet valve 15 to again open and the compressor to again start operation. A conduit 27 extends from a point within the valve body 10 to the rear of the diaphragm 23 which forms the closed cavity 26 within which the spring 24 operates. This reduction of pressure operating against the upper side of the diaphragm 23 still further elevates the valve 17 by additional flexure of the diaphragm. This takes place for the reason that the pressure difference on opposite sides of diaphragm 23 is increased. Before the diaphragm 23 is forced downward again by a drop in the receiver pressure, this additional pressure difference must be eliminated so that the pressure difference on the opposite sides of diaphragm 23 just equals the pressure exerted by the spring 24. The operation therefore of again starting the regulator is delayed depending upon the amount of reduction in pressure in rear of diaphragm 23.

To provide means for varying the reduction in pressure in rear of diaphragm 23, and in that way controlling the sensitiveness of the regulator, I provide an adjusting screw 28 and a leak port 29. The adjusting screw 28 at its inner end enters the passage 27, and, if forced inward, entirely closes the passage. The leak port 29, in the form of a small opening in a button member 30 between the adjusting screw 28 and cavity or chamber 26 is constantly open. It will be seen therefore that by suitably adjusting the screw 28, the reduction in pressure within the regulator body 10 by means of the restricted passage through conduit 27 will cause a reduction in pressure in rear of the diaphragm 23. Also, by completely closing the passage 27 by adjustment of the screw 28, no pressure differences due to the vacuum in the regulator body 10 will be induced in rear of the diaphragm 23. When operating under this condition, air is admitted and expelled through the leak port 29 in accordance with vibration of the diaphragm 23.

By withdrawing the screw 28 somewhat so that there is a free flow of fluid through the conduit 27, variations in pressure within the body of the regulator 10 are quickly and fully transmitted to the cavity or chamber 26. With this adjustment of the screw 28, the greatest possible pressure difference is created on opposite sides of the diaphragm 23 and consequently the greatest reduction in receiver pressure within the cavity or chamber 22 must take place before the pilot valve 17 will be again closed. By suitably restricting the passage 27 by adjustment of the screw 28, the reduction in receiver pressure necessary to cause the compressor to again start operating may be controlled.

What I claim is:

1. A regulator for compressors comprising in combination, a body member, a valve therein adapted to open and close the inlet to a compressor cylinder, means normally holding said valve in its open position, pressure operated means comprising a pilot valve opened and closed by movement of a diaphragm to close said inlet valve, a conduit extending from the body member of the regulator to a point within a pressure tight cavity in rear of said diaphragm and provided with a leak port, and screw threaded means to vary the flow of fluid through said conduit, whereby the variations in pressure within said cavity may be controlled to increase or decrease its effect upon the movements of the pilot valve.

2. A regulator for compressors comprising in combination, a body member, a valve therein adapted to open and close the inlet to a compressor cylinder, means normally holding said valve in its open position, pressure operated means comprising a pilot valve opened and closed by movement of a diaphragm to close said inlet valve, conduit means to vary the pressure reduction within a pressure tight cavity in rear of the diaphragm when said pilot valve is in its open position, whereby the closing of said pilot valve may be regulated, and means to regulate the passage of controlling fluid through said conduit, whereby the variations in pressure within said cavity may be controlled to increase or decrease its effect upon the movements of the pilot valve.

In testimony whereof, I hereto affix my signature.

WARD RAYMOND.